Oct. 18, 1960  J. E. ARMSTRONG ET AL  2,956,957
METHOD FOR PRODUCING CLEAR, HOMOGENEOUS SILICA HYDROSOLS
Filed April 2, 1956  3 Sheets-Sheet 1

INVENTORS.
JAMES E. ARMSTRONG
WILLIAM P. CUMMINGS
BY Kenneth E. Prince

Oct. 18, 1960 J. E. ARMSTRONG ET AL 2,956,957
METHOD FOR PRODUCING CLEAR, HOMOGENEOUS SILICA HYDROSOLS
Filed April 2, 1956 3 Sheets-Sheet 2

INVENTORS.
JAMES E. ARMSTRONG
WILLIAM P. CUMMINGS
BY
Kenneth E. Prince

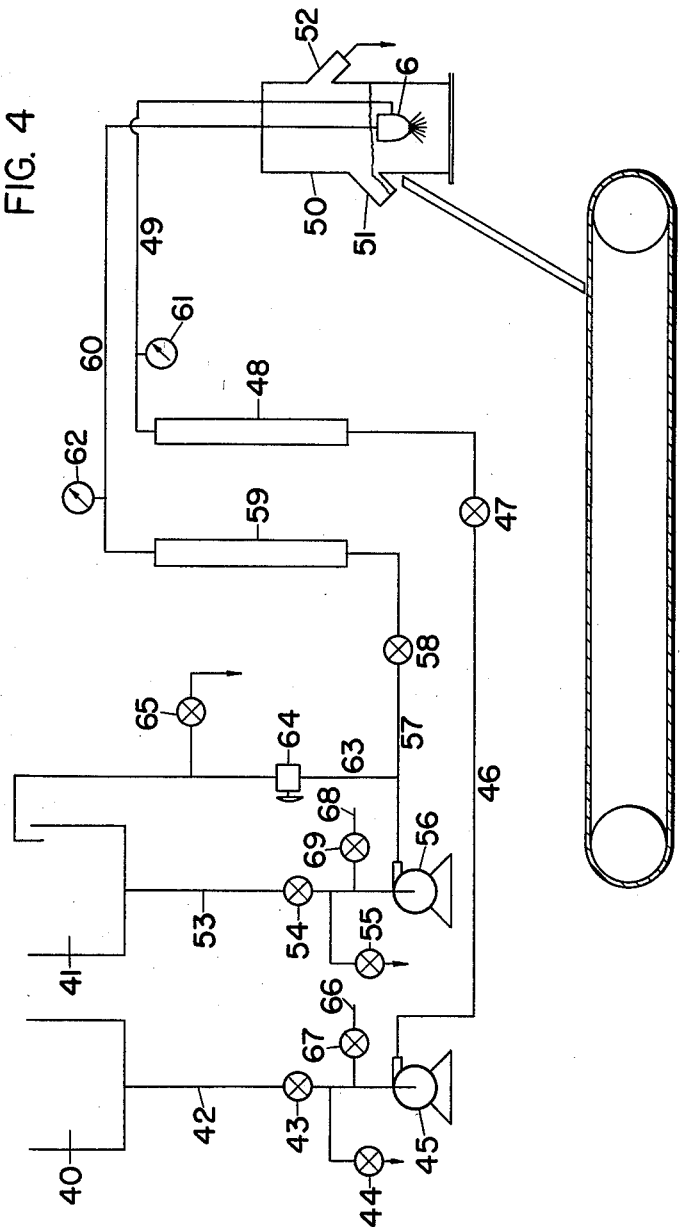

2,956,957
METHOD FOR PRODUCING CLEAR, HOMOGENEOUS SILICA HYDROSOLS

James E. Armstrong, Baltimore, and William P. Cummings, Severna Park, Md., assignors to W. R. Grace & Co., New York, N.Y., a corporation of Connecticut Filed Apr. 2, 1956, Ser. No. 575,433

5 Claims. (Cl. 252—313)

This invention relates to mixing processes and apparatus. In one specific aspect, it relates to silica hydrosols and hydrogels and more particularly to homogeneous silica hydrosols and hydrogels. In another specific aspect, it relates to a method of preparing homogeneous silica sols and gels of high silica content. In still another specific aspect it relates to apparatus useful in the preparation of said sols and gels.

Silica hydrosols are commonly made by reacting a mineral acid, such as sulfuric acid, and a soluble silica compound such as an alkali metal silicate. While it is indicated in the prior art that operation is permissible at ambient temperatures to produce a sol of relatively high silica content, there are practical limitations which cannot seasonably be overcome. These limitations become salient when attempting to produce a hydrosol having a silica content in the range of 20% by weight. In all prior methods difficulty has been experienced by the accumulation of a gelatinous deposit in the mixing equipment when operating in these ranges. In commercial practice this problem was generally avoided by reducing the silica content of the hydrosol or by lowering the reaction temperature by cooling the reactants.

James W. Elston in U.S. Patent No. 2,466,842 describes a method of producing a clear silica hydrosol containing about 14 to 20% by weight of silica by mixing a solution of an alkali metal silicate with an inorganic acid in a special mixing nozzle to form a hydrosol. Using Elston's special apparatus, a typical preparation of a silica hydrosol comprised the mixing of sodium silicate of 37.0° Bé. strength (made by diluting ordinary 40° Bé. sodium silicate of 3.25 to 1 silica/soda ratio) with 32.2° Bé. sulfuric acid. A clear hydrosol containing about 18.1% by weight silica was produced. By using certain specified materials in his nozzle, Elston reduced the troublesome build-up of silica within the nozzle. However, like his predecessors, Elston had to place maximum limits on the temperatures of his reactants. For instance, Elston teaches that when mixing acid and silicate solutions to make hydrosols, the temperature of the acid should not exceed 145° F. and the temperature of the silicate solution should not exceed about 90° F. These maximum temperatures represent critical limits that must be observed to avert silica precipitation (or clouding) in the resulting sol. A further characteristic of the Elston process is the length of time required for gelation when making less concentrated sols. For example, a hydrosol having a silica content of 14 to 15% by weight required a half an hour for setting the hydrosol into a hydrogel.

In another known process for mixing solutions similar in nature, the problem of gelatinous deposits within the mixing apparatus is also encountered. In that process, small amounts of inherent gelatinous material accumulate on the walls of the apparatus usually adjacent to or within the discharge orifice or opening. This difficulty is manifest when the reactant solutions are concentrated and are contacted in such proportions that the stream issuing from the mixing chamber is a completely or substantially completely formed, all-embracing gel. The undesirable accumulation is generally removed by mechanical means.

Heretofore, it has generally been believed, that the formation or accumulation of a gelatinous substance within the mixing apparatus (or sludging as it is sometimes referred to) is an inherent difficulty in the preparation of sols and gels of high silica content. A popular corollary theory frequently entertained by prior art investigators is the adverse effect of increased temperature on sol and gel preparation. They postulate that gels prepared at high run-off temperatures result in a final silica gel that is white or opaque having a very poor mechanical strength.

In accordance with the present invention we have discovered that these difficulties are not insuperable limitations on the gel formation reaction, but are the results of the lack of an adequate method for rapidly and intimately mixing the reactants. Our invention embodies a method and an apparatus for producing a homogeneous hydrosol and hydrogel of high silica content wherein the temperature of the reaction is no limitation upon the quality of our product and no sludging occurs.

As indicated from the foregoing discussion, producing sols of varied silica content is old. It is also well known that an increase in run-off temperature (temperature of reaction) shortens the time required for setting a hydrosol into a hydrogel. Due cognizance was also taken by Elston and others of the effect of normality (or the stoichiometric excess of acid in the hydrosol) in varying the time required for setting. It is known also that sols of increased silica content set more rapidly than those of lesser silica content. These factors, the run-off temperature, the normality, and the silica content, are the criteria for fixing the set time of the hydrosol. One of the considerable improvements shown by the present invention is the elimination of the disability of increased temperature to allow free interplay among these variables.

In accordance with our invention, we have provided a method of mixing an alkali metal silicate and a mineral acid which is not limited by the run-off temperature of the hydrosol. Since raising the run-off temperature and/or increasing the silica content of the gel shortens the set time (or time for gelation) a combination of these variables will be ultimately reached that produces a gel of instantaneous set. One of the important features in our method is that it provides a process for continuously making gels of relatively low silica content. For instance, there are important commercial applications for silica hydrogels having approximately 14% of silica by weight. Since the quality of our product is not affected by increasing the run-off temperature, we can compensate for the lengthening of the set time (which occurs as a natural result of lowering the silica content) by raising the temperature as high as 195° F. to produce a 14% hydrosol that will set in approximately 3 minutes. Such a gel is conveniently produced without resorting to the use of large quantities of excess acid.

It is therefore an object of our invention to produce a homogeneous hydrosol and hydrogel of high silica content. A further object of our invention is to produce a homogeneous hydrosol of high silica content capable of setting to form a hydrogel in a short period of time.

As one particular embodiment of our invention, we show an apparatus for conveniently carrying out our new and novel process. A homogeneous hydrosol of a silica content higher than that obtainable by prior art methods can be produced in our novel apparatus. The mixing nozzle shown in the drawings is obviously for the purposes of illustration and example and is simply representative of this particular embodiment.

Our present invention is more clearly understood when reference is made to the accompanying drawing.

In the drawings:

Fig. 4 is a diagrammatic flowsheet of an apparatus for carrying out the method of the present invention.

Figure 1:
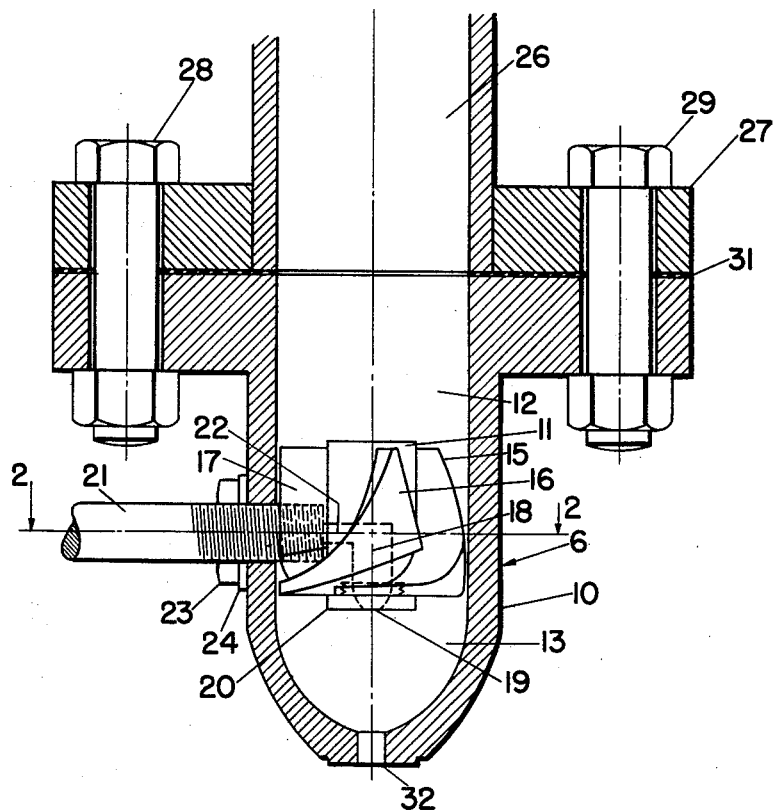
Fig. 1 is a vertical section view of a mixing nozzle representing one particular embodiment of the present invention.
Figure 2:
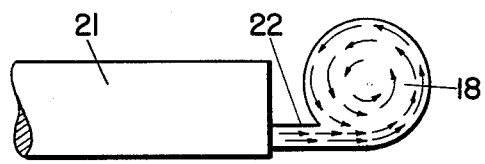
Fig. 2 is a cross section of the spin chamber located within the multivaned turbine center of the mixing nozzle along line 2—2.

Referring at first to Fig. 1, the mixing nozzle shown generally at 6 comprises an outer casing 10 divided by a multivaned turbine center 11 into coaxial chambers 12 and 13, comprising respectively a feed channel and a mixing chamber. Vanes 15, 16, and 17 are laterally directed toward the surface of revolution of mixing chamber 13. A spin chamber 18 with a continuous surface of revolution is located concentrically and coaxially within the turbine center 11, which also is provided with an orifice 19 whereby fluid within the spin chamber 18 is discharged into the mixing chamber 13. Spin chamber 18 may have a lower threaded portion, and orifice 19 may be disposed within a removable plug 20 or similar structure that may be inserted in the threaded portion, to facilitate replacing orifice 19 as required. The spin chamber 18 communicates with acid inlet line 21 by means of a restricted passageway 22 which is tangent to the surface of revolution of spin chamber 18 and extends laterally away from it. Acid inlet line 21 is secured to the multivaned turbine center 11 by screw connection or other equivalent means. It may be positioned within chamber 10 by lock nut 23 and gasket 24. Chamber 10 is connected to the silicate inlet line 26 by a flange 27 secured by bolts 28 and 29. Gasket 31 prevents leakage of the silicate solution. The nozzle operation is further explained by reference to Fig. 2 which shows spin chamber 18 with the acid inlet 21 and the restricted passageway 22. Acid entering the spin chamber 18 acquires a whirling motion or tangential velocity as it proceeds in a downward direction along the surface of revolution of the spin chamber 18 toward the orifice 19.

Figure 3:
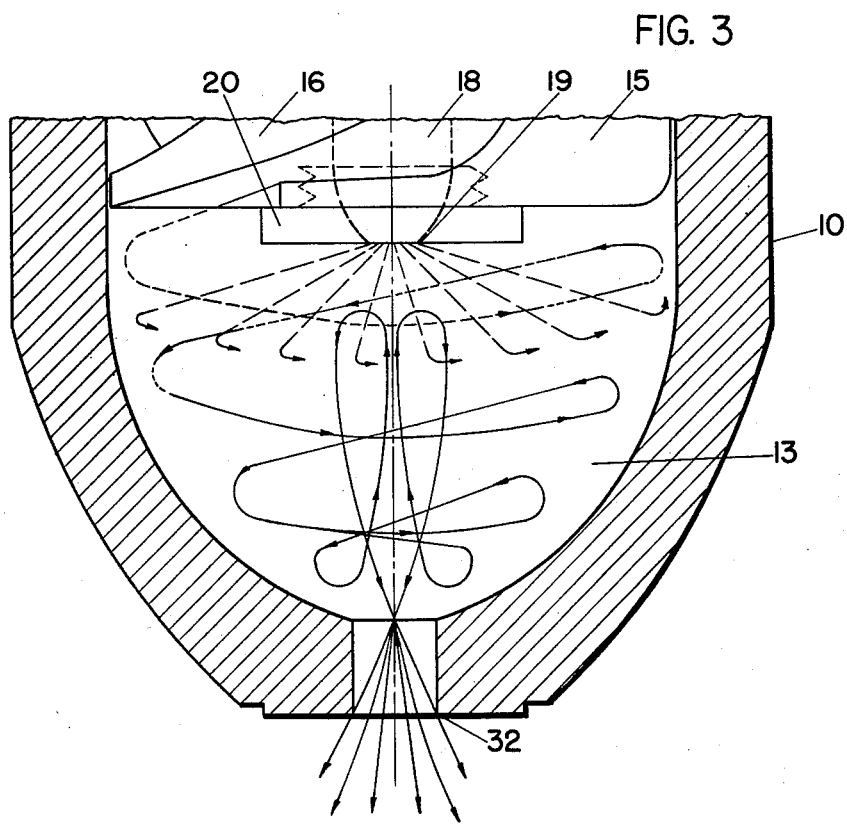
Fig. 3 is a vertical section of the mixing chamber, indicating the probable mixing pattern of the fluids.

Our novel method of mixing the reactants in the preparation of a silica hydrosol containing 10–22% of silica by weight, is cogently illustrated by Fig. 3. An alkali metal silicate solution of the appropriate concentration is delivered under pressure at a high potential mixing energy to the mixing nozzle. As the confined silicate stream encounters the vanes 15, 16, and 17, a whirling motion or tangential velocity is imparted to the stream. The distance between the silicate vanes at their tips at the point of discharge into the mixing chamber of the nozzle is restricted. The passage of the silicate stream through this confined space imparts thereto a high axial velocity as well as a tangential velocity.

In the mixing chamber 13, the silicate encounters the acid stream which as hereinbefore indicated, possesses a tangential velocity resulting from the whirling motion of the acid as it passes around the surface of revolution of the spin chamber 18. The addition, an axial velocity is imparted to the acid stream as it leaves the orifice 19 and passes into the mixing chamber 13. The acid stream is delivered under pressure at a high potential mixing energy to the spin chamber. An important feature of our mixing apparatus is the distribution of the acid stream within the swirling body of silicate. For the purposes of our discussion we will use the terms mixing energy and total pressure (in p.s.i.a.) as equivalents. We have found that if the acid streams possesses sufficient mixing energy or is under sufficient total pressure, it will form a hollow conical distribution pattern or uniform weight flow distribution pattern as it leaves the orifice to the acid spin chamber. Experiments have indicated to us that a total pressure of 125–150 p.s.i.a. developed in the acid stream at the point of discharge to orifice 19 is sufficient to effect this uniform weight flow distribution. We have found it preferable, however, to maintain the total pressure in the acid stream at a level somewhat above 150 p.s.i.a. as a safe operating level. The acid streams, as it leaves orifice 19, ceases to swirl or rotate and particles within the stream move in a straight line tangent to the orifice. As the acid and silicate streams, are passed simultaneously into mixing chamber 13, the acid is directed in an ever-widening cone toward the whirling body of silicate. Orifice 32, the exit of the mixing chamber, hereinafter referred to as the discharge orifice, is restricted in size so as to create a high mixing energy or total pressure within the hydrosol during egress. The restriction of the discharge orifice offers the further advantage of creating turbulence within the mixing zone to insure a greater degree of mixing taking place between the two fluids.

The total pressure P in p.s.i.a. can be more clearly understood in terms of well-known and fundamental theoretical considerations. The total pressure of the acid stream at orifice 19 or the total pressure of the hydrosol stream as it leaves the discharge orifice 32 may be determined by an abbreviated form of Bernoulli's equation:

$$P = \frac{\rho V_t^2}{2G_c} + \frac{\rho V_v^2}{2G_c} + p$$

wherein:

$P$ = total pressure at any point in the liquid, lbs./in.$^2$ absolute
$\rho$ = density of the liquid stream, lbs./in.$^3$
$V_t$ = tangential velocity of liquid, in./sec.
$V_v$ = axial velocity of liquid, in./sec.
$G_c$ = gravitational constant, in./sec.$^2$ (32.2 ft./sec.$^2$)
$p$ = static pressure within the liquid lbs./in.$^2$ absolute By reference to this formula we can further sub-divide P into its component parts, viz: the tangential velocity, the axial velocity, and the static pressure. The static pressure can be measured by gages appropriately placed at a point intermediate the delivery pump and the feed inlet in each stream.

Accurate expressions for the axial and tangential velocities are somewhat more difficult to obtain. Reference is made at this point to W. R. Marshall, Jr.'s discussion of pressure nozzles in Atomization and Spray Drying, Chemical Engineering Monograph Series, A.I.Ch.E., 1954. Further reference is made to empirical data developed by M. Doumas and R. Laster (Chem. Eng. Prog., 49, 518, 1953) which was referred to in Marshall's publication. By combining certain of the ideas presented in Marshall's publication, we developed a formula sufficient to give to us an apparent or relative value for the total pressure P at the critical points, viz: orifice 19 and discharge orifice 32. This provides a tool by means of which different physical configurations within a mixing apparatus may be evaluated. The formula leads us to an apparent or relative pressure that is a critical feature of our mixing process, and at the same time a governing element in the design of our novel apparatus.

To obtain a value for the apparent pressure of the acid stream as it is being discharged from the orifice of the spin chamber, one simply takes the physical measurement of the nozzle mechanism being employed and substitutes these values in the following Formula I.

(I)

$$P_A = \frac{\rho_A Q_A^2}{92{,}000 \text{ ft./sec.}^2} \left[ \frac{(R_A)^4 + (N_i)^2(r_i)^4 \left[ 0.81 + 0.70\left(\frac{R_a R_\pi}{(r_i)^2}\right)^{0.71} \right]^2}{(R_A)^4 (N_i)^2 (r_i)^4} \right] + p_a$$

$P_A$ = Total pressure, acid stream, at orifice (19), lbs./in.² absolute
$\rho_A$ = Density of acid, lbs./ft.³
$Q_A$ = Acid flow rate, ft.³/sec.
$R_A$ = Radius of orifice (19), ft.
$N_i$ = Number of inlets (22), dimensionless number
$r_i$ = Radius of inlet (restricted passageway 22), ft.
$R_w$ = Radius of acid spin chamber (18), ft.
$p_2$ = Gage (61) pressure +14.7, lbs./in.² absolute It is understood from the foregoing discussion that a value for apparent pressure of at least 125 p.s.i.a. indicates that a conical uniform weight flow distribution of acid is being obtained during egress from the spin chamber orifice.

The more critical value of the apparent pressure at the discharge orifice of the mixing chamber can be quickly ascertained by taking the appropriate physical measurements on the mixing apparatus and substituting values thus obtained in the following Formula II hereinunder provided.

(II)
$$P_H = \frac{1}{9{,}200 \text{ ft./sec.}^2} \left[ \frac{\rho_s(Q_s)^2 \cos^2 \alpha}{(N_v)^2(A_v)^2} + \frac{\rho_H(Q_A+Q_s)^2}{9.9(R_o)^4 \left[ 0.81 + 0.70 \left( \frac{3.1 R_o R_s}{N_v A_v + 3.1(R_A)^2} \right)^{0.71} \right]^2} \right] + p_1$$

$P_H$ = Total pressure, hydrosol stream, at discharge orifice (32), lbs./in.² absolute
$\rho_s$ = Density of silicate, lbs./ft.³
$\rho_H$ = Density of hydrosol, lbs./ft.³
$Q_s$ = Silicate flow rate, ft.³/sec.
$Q_A$ = Acid flow rate, ft.³/sec.
$\alpha$ = Angle of vanes (15, 16, 17) from plane perpendicular to axis of chamber (10), degrees
$N_v$ = Number of vane inlets to mixing zone (13), dimensionless number
$A_v$ = Area of vane inlet, ft.²
$R_o$ = Radius of orifice (32), ft.
$R_s$ = Radius of mixing zone (13), ft.
$R_A$ = Radius of orifice (19), ft.
$p_1$ = Gage (62) pressure +14.7, lbs./in.² absolute We have found that an apparent pressure of 250 p.s.i.a. represents the lowest pressure that will provide at all times a clear homogeneous hydrosol, notwithstanding the run-off temperature and the concentration of the silica within the hydrosol. This statement is not intended to embrace the presumption that there are no limits to the run-off temperature or to the silica content of the hydrosol. We are merely emphasizing that these limits are not defined by the homogeneity of the hydrosol and hydrogel, but are inherent from other features of the process. For instance, the weight percent silica that can be obtained in the hydrosol using the methods of conventional solution chemistry is limited by the concentration of the sodium silicate solution. As a practical matter, this limitation is manifest in sodium silicate solution commercially available for use. A typical commercial sodium silicate has a silica to soda ratio of 3.25:1; it is available in concentrations approximating 40° Bé. (27.6% $SiO_2$). Cold 40° Bé. sodium silicate solution is very viscous. While the use of such a solution in our process borders on the dubious limits of desirability, it is suggestive of a feature of our novel mixing method which will be discussed subsequently.

It is likewise apparent, that high run-off temperatures at high concentrations of silica in the sol will eventually produce a gel of instantaneous set. Quick set does not affect the homogeneity of the gel using our novel mixing method. However, in practice, we find it desirable to produce a gel from a sol that has a set time of about 2 minutes in order to permit any entrapped air to escape before gelation. Air bubbles in the gel were found to be undesirable since they may provide focal points for fracture during subsequent operations. Such fractures would have a detrimental effect on the ultimate size of the dried gel.

In preparing a silica hydrosol in accordance with our invention, an arrangement of apparatus similar to that illustrated in Fig. 4 of the drawing may be employed. As illustrated, a supply tank 40 is provided for maintaining an adequate supply of a strong mineral acid such as sulfuric acid. This supply tank can be conveniently provided with open steam heaters if it is found desirable to heat the acid, or with cooling water coils if operation at a lower temperature is deemed preferable. Water can be used to dilute the acid to desired operating strength. At the lower portion of the tank 40 there is provided a discharge conduit 42 having a control valve 43 interposed therein for conveying the acid from the tank to the intake of a suitable pump 45. Drain valve 44 may be opened if it is desired to clean the tank 40. The acid is forced under pressure by the pump 45 through a conduit 46 to a flow regulating valve 47. Acid flow can be conveniently measured by rotameter 48 located intermediate valve 47 and mixing nozzle 6 in conduit 49. With the pump 45 running at a speed sufficient to produce a constant delivery at a high potential energy, the flow of the acid to the mixing nozzle 6 may be controlled by adjusting the flow regulating valve 47 and may be conveniently measured by rotameter 48.

An alkali metal silicate solution such as sodium silicate is maintained in a tank 41 provided with an outlet conduit 53 equipped with a valve 54 for supplying the silicate solution to a suitable pump 56. Tank 41 may be provided with open steam heaters or cooling water coils if it is found desirable to adjust the temperature of the silicate solution. Drain valve 55 may be utilized when it is necessary to clean tank 41. Water may be provided to adjust the concentration. A by-pass conduit 63 equipped with pressure regulator 64 is provided for controlling the static pressure in the silicate line and recirculating portions of the silicate stream to tank 41. Such portions may be discarded through by opening drain valve 65. The silicate is forced at a high potential energy from pump 56 through conduit 57 to flow regulating valve 58. The flow rate of the silicate solution is conveniently measured by rotameter 59 located in conduit 60 intermediate flow regulating valve 58 and mixing nozzle 6. As hereinbefore described, the solutions of acid and sodium silicate are mixed in nozzle 6 and the resulting mixture is discharged into boot or receiver 50. The boot 50 is provided with overflow line 52 and discharged outlet 51. Discharge outlet 51 is conveniently located to maintain the level of the hydrosol just above the upper surface of the nozzle 6, thereby resulting in a complete immersion of the nozzle in a bath of hydrosol. The static pressures of the acid and silicate streams entering the nozzle mixing chamber are measured by gages 61 and 62 respectively. In practice, we have found the pressure drop across the respective lines from gages thus positioned to the mixing chamber of the nozzle to be negligible. From outlet 51 the silica hydrosol may be directed to a continuous setting apparatus such as a moving belt. The hydrosol can be allowed to remain on such an apparatus for predetermined time until gelation takes place. After setting or gelation, the hydrogel thus formed may be removed from the setting mechanism, sized, washed, dried, and activated.

Water supply lines 66 and 68, controlled by valves 67 and 69, are provided to facilitate flushing and cleaning of the acid and silicate lines respectively. A water flush can be conveniently used in starting up and shutting down the plant.

A plant for the production of silica hydrosol such as the one diagrammatically illustrated in Fig. 4 of the drawings can be put on stream by the method hereinunder described. Valves 43 and 54 are placed in the closed position. Drain valves 44, 55, and 65 are closed. Valves 67 and 69 are open, thereby allowing water to flow through both lines. Acid pump 45 is started; a desired flow rate (measured by rotameter 48) is obtained by adjusting valve 47. After the desired flow rate has been obtained, valve 43 is opened to permit acid to enter the line and the water flow is cut off by closing valve 67. Valve 65 is opened and pump 56 is started. When a predetermined flow rate has been established (measured by rotameter 59) by regulating valve 58, valve 54 is opened to permit silicate to enter the line. Valve 69 is closed to cut off the water supply. Pressure regulator 64 controls the static pressure in the silicate line measured on gage 62. Since pump 56 can deliver the silicate at a higher static pressure than is required for operation, by-pass line 63 is provided to recycle a sufficient portion of the silicate, thereby reducing the static pressure of the silicate stream. After all of the water is out of the silicate line, valve 65 is closed to permit recycling of the excess silicate. Adjustments in desired flow rates can now be made by regulating valves 47 and 58. The plant is now on stream for continuous operation; hydrosol can be conveniently directed to a setting mechanism. Overflow line 52 is provided in boot 50 to provide for disposal of the hydrosol in the event of a malfunction.

In order to prevent gelation in the equipment during the shutting down procedure, water may be once again run through the silicate line. The change from a silicate to a water stream can be conveniently accomplished by a procedure converse of that described above.

At this point, it might be well to indicate certain critical features in our apparatus and method of mixing. Obviously, the foregoing discussion of plant preparation of silica hydrosol and hydrogel and the equipment and apparatus described therein was intended merely to illustrate how our novel mixing method and special apparatus could be commercially applied. We noted during this discussion that a silicate solution as concentrated at 40° Bé. could be utilized in such equipment. We have already pointed out such a solution as extremely viscous. The inherent difficulty in rapidly and intimately mixing two fluids that vary considerably in viscosity is overcome by our novel method and apparatus. It is a known principle of hydrodynamics that a fluid of greater mixing energy will transfer its energy to a fluid of lesser mixing energy if the fluid of lesser mixing energy is dispersed within and entrained in the fluid of greater mixing energy. It is obvious that if we mix, in unequal proportion, two fluids together differing vastly in viscosity (the fluid of greater viscosity being present in greater quantity) that relatively little energy transfer will result unless the fluid having greater viscosity also possesses the greater mixing energy. By syllogistic logic we arrive at the very tenable conclusion that the acid stream must be finely divided and intimately dispersed within a whirling silicate stream containing an equal or greater amount of kinetic mixing energy. The application of this principle is a touchstone of our new and novel method and apparatus.

The axial velocity of a fluid stream which is the major component of its total pressure (viz: mixing energy) can be substantially increased by passing the fluid through a restriction or orifice. In the design of our novel apparatus we apply this principle. The acid stream to which a swirling motion is imparted by tangentially contacting it with a surface of revolution is increased in axial velocity by passing it through a small orifice. From the foregoing discussion, it is understood that total pressure can be calculated by Bernoulli's equation, which in one of its forms comprises an expression of the tangential velocity, axial velocity, and static pressure. We have provided a formula equivalent to Bernoulli's equation from which an apparent pressure may be obtained by substituting easily measurable physical quantities. With the use of this convenient tool one skilled in the art can compare the relative or apparent pressures (hence mixing energies) for solutions mixed by our novel method in devices similar to our novel apparatus. By obtaining an apparent pressure of above 125 p.s.i.a. we provide a finely divided conical weight flow distribution pattern of acid which is dispersed into a whirling body of silicate. In addition, by the special construction of our multivaned turbine center we provide not only a swirling motion or tangential velocity to the silicate stream, but that which is much more vital; a high kinetic mixing energy within the swirling body of silicate. It is one thing to provide high pressure pumps which deliver a stream of liquid at a high potential energy and quite another to provide a device that efficiently converts this potential energy into useful kinetic energy. This we have accomplished. Since the volume of silicate in the mixture is considerably greater than the volume of acid, it is necessary that the silicate stream contain an amount of mixing energy equivalent to, or greater than, the acid in order to promote uniformity of energy throughout the mixture. The kinetic mixing energy is imparted to the silicate stream as it passes through the narrow confines of the restriction between the vanes of the turbine center. The vanes, therefore, do more than merely providing a swirling or tangential velocity. Since the space between the vanes is little more than a narrow slit, it imparts an axial velocity of great magnitude to the silicate stream entering the mixing chamber. By providing a discharge orifice to the mixing chamber of limited dimension, we are able to prevent the dissipation of the kinetic energy of both acid and silicate streams and create a high degree of turbulence within the mixing chamber. Simple physical measurements can be made on a mixing device embodying the principles of our novel method of mixing and related, using Formula II, to obtain an apparent pressure. As hereinbefore stated, an apparent pressure or mixing energy in the sol at the discharge orifice to the mixing zone of 250 p.s.i.a. will produce a clear homogeneous hydrosol, notwithstanding the run-off temperature or the silica content of the sol, subject of course, to the inherent limitations of the process.

The materials of construction for our novel apparatus when used in concert with our novel method for producing hydrosol must be acid resistant. The selection of materials is otherwise unqualified. For example, brass, "Worthite," "Duriron," and "Chlorimet-2" have held up well under repeated testing. Obviously, consideration must be given the reactant concentrations and temperatures in order to select the best material. The mixing chamber may be made of either metal or a plastic composition. "Lucite" and "Tylon" have been found to be suitable.

The efficiency of our novel method of mixing and our superior mixing apparatus is cogently illustrated by the data in Table I.

Table I

| | Old Apparatus and Mixing Process | New Apparatus and Mixing Process |
|---|---|---|
| Percent $SiO_2$ in Hydrogel | 19.6 | 19.7 |
| Physical Appearance of Hydrogel | Opaque | Clear, Homogeneous |
| Screen Test (U.S. Sieves), Wt. Percent: | | |
| On 3 | 0.3 | 2.1 |
| On 4 | 4.8 | 20.0 |
| On 6 | 23.8 | 54.2 |
| On 8 | 43.3 | 71.8 |
| On 18 | 75.3 | 87.3 |
| On 80 | 97.3 | 98.1 |
| T-80 | 2.7 | 1.9 |
| 3-8 | 43.0 | 69.7 |

In the gel industry, it is desirable to produce a final dried gel having large uniform particles. That gel having a size range of 3–8 mesh U.S. sieves, is an especially desirable commercial commodity. Table I is a comparison of the final dried silica gel products made in two different mixing devices by two different mixing processes. In the first instance, a cloudy, opaque gel resulted when using a mixing apparatus similar to the one embraced by this invention that did not employ the critical limitations on the mixing energies of the fluids taught by our new and novel method. The mixing device did not contain the definitive structural relationship of our novel apparatus. The second set of results represent the size measurements of a uniform homogeneous silica hydrogel made with our method and apparatus. It may also be added that the results show the maximum silica content that could be obtained using the old device. The limits of weight percent silica in the hydrogel of the produce obtainable by our novel method and apparatus had not yet been reached in this particular test. Our invention is further illustrated by the following examples. Examples I through IX are summarized in Table II.

Each of the sol preparations in the examples were made using equipment hereinbefore described employing a similar operating procedure. The sol of Examples I and II were made without the benefit of our novel mixing method. The resulting gels were cloudy and opaque and unstable in their physical strength. Compare Table I.

The remaining examples illustrate the successful operation of our invention. It is significant to re-emphasize at this point the flexibility that our process makes possible. Since there are no direct restrictions on the temperature of the reactants, we have been able to produce a clear homogeneous hydrosol and resulting gel containing 12–14% silica having a set time of 3 to 5 minutes. Commercial preparation of such a gel is herewith made possible.

The data of Table II is self-explanatory. Whenever the critical limitations of our novel process were utilized (viz: acid stream kinetic mixing energy greater than about 125 p.s.i.a., hydrosol stream kinetic mixing energy greater than about 250 p.s.i.a.), clear homogeneous sols and gels were obtained. We wish to re-emphasize that a clear sol can be made under apparent pressures somewhat less than our critical limits. Using lower reactant temperatures or less viscous reactant solutions (having lesser silica content) mitigates the mixing requirements. Our process operates effectively under all conditions indigenous to non-boiling solutions. While the data in Table II exhibits a considerable range of variation among independent variables, it should by no means be construed as a limitation on our process. For instance, it may become desirable in some future commercial operation to prepare a silica hydrosol from undiluted 98% sulfuric acid and 40° Bé. sodium silicate to produce a silica hydrosol containing about 22% by weight. Our novel method and apparatus would fill the requirements of such a process.

We claim:
1. A method of producing a clear homogeneous silica hydrosol containing about 10–22% by weight silica comprising introducing to a mixing zone a stream of alkali metal silicate solution at a pressure and direction sufficient to create a whirling mass thereof, passing the whirling solution downwardly through a confined area in said zone to a mixing chamber having a restricted discharge port, contacting said silicate solution in said chamber with an intimate dispersion of a finely divided stream of a mineral acid having an apparent pressure of at least 125 p.s.i.a. prior to said contact, said contact effecting a uniform weight flow distribution of acid with the silicate solution and creating extreme turbulence within the mixing chamber resulting in an apparent pressure of at least 250 p.s.i.a., and collecting the hydrosol formed thereby which passes through the restricted discharge port of the mixing chamber.

2. A method according to claim 1 wherein the alkali metal silicate is sodium silicate.

3. A method according to claim 1 wherein the mineral acid is sulfuric acid.

*Table II*

| Example No. | Apparatus and Method Used | ° Bé. Acid at 60° F. | Acid Temp., ° F. | ° Bé. Silicate at 60° F. | Silicate temp., ° F. | Run Off (Hydrosol) Temp., ° F. | Set Time, Min. | Normality | Percent SiO₂ Hydrosol | Appearance of Gel | P Acid Stream, p.s.i.a. | P Hydrosol, p.s.i.a. |
|---|---|---|---|---|---|---|---|---|---|---|---|---|
| I    | Old | 42.0 | 80  | 36.0 | 69  | 118 | 4.6 | 0.73 | 19.4 | Cloudy   | 117.2 | 86.6  |
| II   | Old | 40.5 | 54  | 38.2 | 54  | 111 | 2.7 | 0.68 | 19.9 | Cloudy   | 185.2 | 238.0 |
| III  | New | 39.9 | 96  | 37.2 | 72  | 127 | 2.2 | 0.55 | 19.9 | Clear    | 159.2 | 315.6 |
| IV   | New | 44.0 | 176 | 35.8 | 83  | 146 | 1.1 | 0.50 | 20.1 | Clear ¹  | 245.2 | 384.3 |
| V    | New | 40.1 | 68  | 37.2 | 72  | 125 | 2.1 | 0.55 | 19.8 | Clear    | 168.4 | 261.7 |
| VI   | New | 40.3 | 162 | 24.0 | 150 | 187 | 5.0 | 1.3  | 12.7 | Clear    | 220.2 | 249.0 |
| VII  | New | 41.9 | 158 | 23.8 | 148 | 186 | 3.7 | 1.5  | 13.0 | Clear    | 213.9 | 284.0 |
| VIII | New | 41.9 | 158 | 23.8 | 148 | 190 | 5.8 | 1.1  | 13.0 | Clear    | 214.5 | 265.3 |
| IX   | New | 40.2 | 162 | 26.0 | 150 | 191 | 4.8 | 1.0  | 14.2 | Clear    | 193.4 | 369.0 |

¹ Entrapped air bubbles.

4. A method according to claim 1 wherein the hydrosol is discharged from the mixing chamber under a bath of silica hydrosol.

5. A method of producing a clear homogeneous silica hydrosol containing about 10–22% by weight silica comprising introducing a whirling mass of sodium silicate solution into a mixing chamber having a restricted discharge port, introducing sulphuric acid into said chamber in a hollow conical distribution pattern in contact with the whirling silicate solution, said acid having an apparent pressure of at least 125 p.s.i.a. prior to said contact, said contact effecting a uniform weight flow distribution of acid with the silicate solution and creating extreme turbulence within the mixing chamber resulting in an apparent pressure of at least 250 p.s.i.a., and collecting the hydrosol formed thereby and which passes through the restricted discharge port of the mixing chamber.

References Cited in the file of this patent

UNITED STATES PATENTS

| | | |
|---|---|---|
| 1,756,625 | Behrman | Apr. 29, 1930 |
| 2,428,895 | Shoeld | Oct. 14, 1947 |
| 2,466,842 | Elston | Apr. 12, 1949 |
| 2,483,951 | Watson | Oct. 4, 1949 |
| 2,701,164 | Purchas et al. | Feb. 1, 1955 |

FOREIGN PATENTS

| | | |
|---|---|---|
| 159,556 | Australia | Nov. 1, 1954 |

OTHER REFERENCES

Spencer et al.: "Gelation Times of Various Silica Sols," Ind. Eng. Chem., May 1951, pages 1129–32.